United States Patent
Young et al.

(10) Patent No.: US 11,017,115 B1
(45) Date of Patent: May 25, 2021

(54) PRIVACY CONTROLS FOR VIRTUAL ASSISTANTS

(71) Applicant: Wells Fargo Bank, N.A., San Francisco, CA (US)

(72) Inventors: Michelle M. Young, Houston, TX (US); Paul Vittimberga, Oakland, CA (US); Wayne Barakat, Novato, CA (US); David Newman, Walnut Creek, CA (US); Vincent Le Chevalier, San Jose, CA (US); Brian P. McMahon, Berkeley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/797,840

(22) Filed: Oct. 30, 2017

(51) Int. Cl.
| | |
|---|---|
| G06F 21/62 | (2013.01) |
| G06F 21/60 | (2013.01) |
| G10L 15/26 | (2006.01) |
| G06F 21/31 | (2013.01) |
| G10L 21/10 | (2013.01) |
| G10L 25/48 | (2013.01) |
| G06F 3/16 | (2006.01) |

(52) U.S. Cl.
CPC .......... *G06F 21/6245* (2013.01); *G06F 3/167* (2013.01); *G06F 21/31* (2013.01); *G06F 21/60* (2013.01); *G10L 15/26* (2013.01); *G10L 21/10* (2013.01); *G10L 25/48* (2013.01)

(58) Field of Classification Search
CPC .............................. G06F 21/6245; G06F 21/60
See application file for complete search history.

(56) References Cited

U.S. PATENT DOCUMENTS

| | | | |
|---|---|---|---|
| 9,189,697 B1* | 11/2015 | Daniel | G06K 9/3241 |
| 9,208,753 B2* | 12/2015 | Chan | G06T 7/593 |
| 9,524,631 B1* | 12/2016 | Agrawal | G08B 21/18 |
| 9,680,983 B1* | 6/2017 | Schuster | H04M 1/72569 |
| 9,898,610 B1* | 2/2018 | Hadsall | G06F 21/6245 |
| 2002/0078204 A1* | 6/2002 | Newell | G06F 1/163 709/225 |
| 2006/0228003 A1* | 10/2006 | Silverstein | G01S 17/04 382/115 |
| 2006/0247919 A1* | 11/2006 | Specht | H04K 3/825 704/201 |
| 2007/0071206 A1* | 3/2007 | Gainsboro | H04M 3/2281 379/168 |
| 2009/0097671 A1* | 4/2009 | Paradiso | H04M 1/19 381/73.1 |
| 2010/0053359 A1* | 3/2010 | Mooradian | G06K 9/4661 348/222.1 |
| 2010/0205667 A1* | 8/2010 | Anderson | G06F 3/013 726/19 |
| 2011/0188666 A1* | 8/2011 | Mason | G10K 11/175 381/73.1 |
| 2013/0103943 A1* | 4/2013 | Hirsch | G09C 5/00 713/168 |

(Continued)

*Primary Examiner* — Bryan S Blankenagel
(74) *Attorney, Agent, or Firm* — Schwegman Lundberg & Woessner, P.A.

(57) ABSTRACT

Among other things, embodiments of the present disclosure can help improve the functionality of virtual assistant (VA) systems by implementing privacy controls that protect the gathering and storage of information via the VA. The VA systems of the present disclosure may also adapt its responses to users based on such privacy controls.

14 Claims, 4 Drawing Sheets

(56) References Cited

U.S. PATENT DOCUMENTS

| | | | | |
|---|---|---|---|---|
| 2014/0181715 | A1* | 6/2014 | Axelrod | G06F 3/0487 |
| | | | | 715/771 |
| 2014/0309999 | A1* | 10/2014 | Basson | G10L 25/00 |
| | | | | 704/270 |
| 2015/0046161 | A1* | 2/2015 | Locker | G09B 5/06 |
| | | | | 704/246 |
| 2015/0156171 | A1* | 6/2015 | Biswas | H04L 63/04 |
| | | | | 726/26 |
| 2016/0118036 | A1* | 4/2016 | Cheatham, III | G10K 11/178 |
| | | | | 380/252 |
| 2016/0253998 | A1* | 9/2016 | Iyer | G10L 15/22 |
| | | | | 704/275 |
| 2016/0261532 | A1* | 9/2016 | Garbin | H04L 51/04 |
| 2016/0350553 | A1* | 12/2016 | Alameh | G06F 21/6245 |
| 2018/0285592 | A1* | 10/2018 | Sharifi | G06F 21/6245 |
| 2019/0014404 | A1* | 1/2019 | Olsson | G10L 25/78 |
| 2019/0149955 | A1* | 5/2019 | Rusu | H04W 4/21 |
| | | | | 455/456.1 |

* cited by examiner

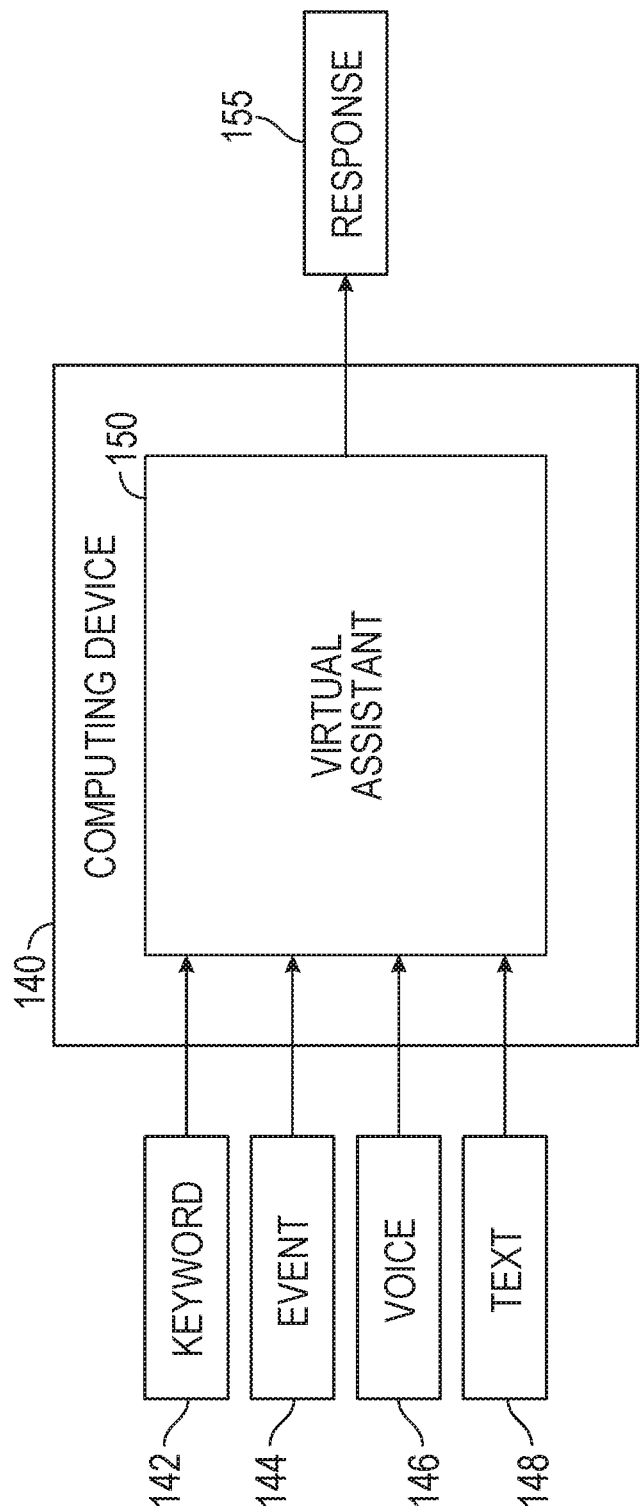

PRIVACY CONTROLS FOR VIRTUAL ASSISTANTS

BACKGROUND

The popularity of virtual assistants (VAs) continues to grow. Virtual assistants are software-implemented systems that interact with users (often via voice recognition) to answer questions and perform tasks and services for users. Conventional VAs often capture and store large amounts of information, but may not provide suitable privacy controls to protect such information. Embodiments of the present disclosure address these and other issues.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which:

FIG. 1B illustrates a block diagram of a virtual assistant operating on a computing device according to various aspects of the disclosure;

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure can help improve the functionality of virtual assistant (VA) systems by implementing privacy controls that protect the gathering and storage of information via the VA. The VA systems of the present disclosure may also adapt its responses to users based on such privacy controls.

Figure 1A:
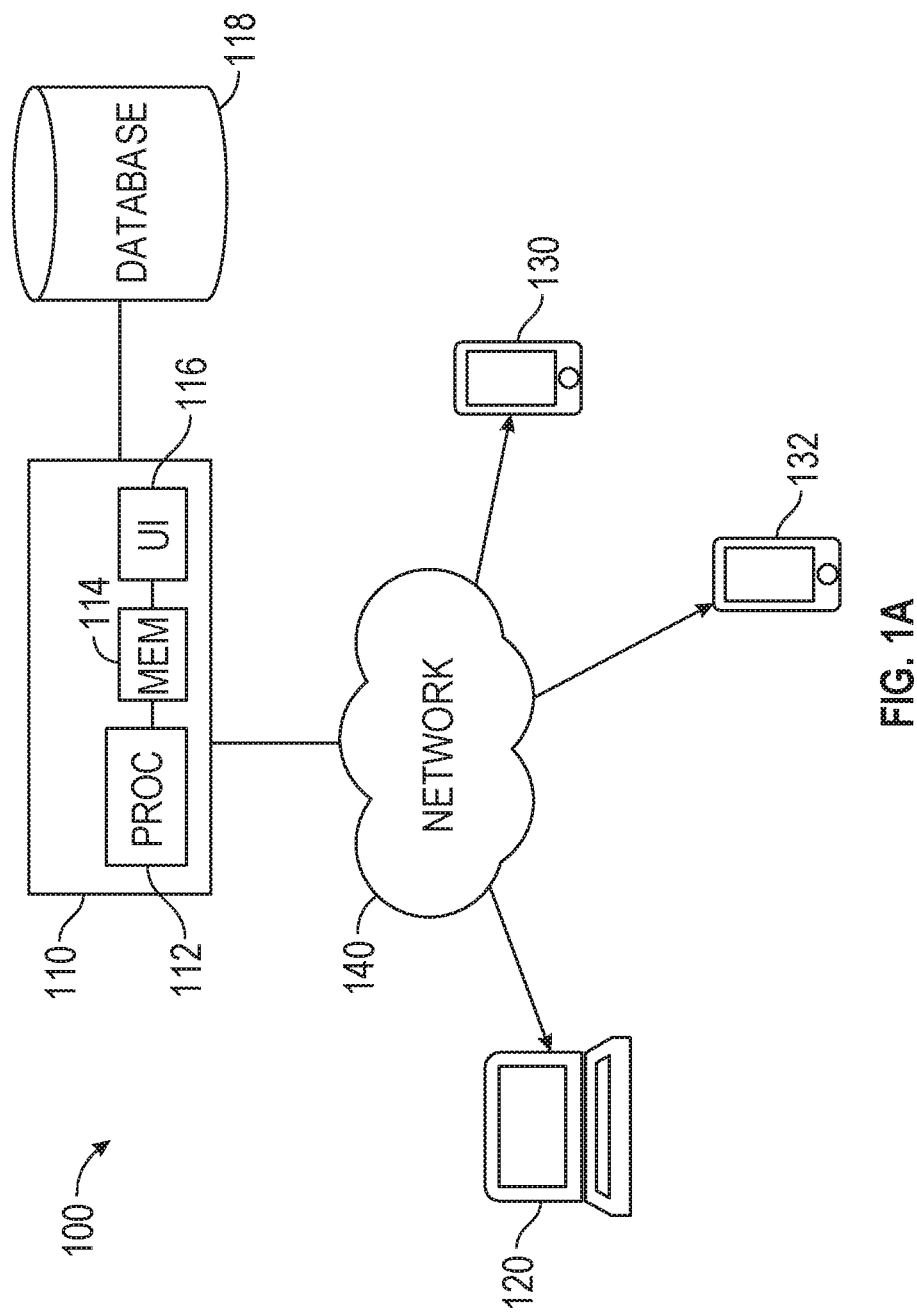
FIG. 1A illustrates a block diagram of an exemplary system according to various aspects of the disclosure.

FIG. 1A is a block diagram of system which may be used in conjunction with various embodiments. While FIG. 1A illustrates various components of a computer system, it is not intended to represent any particular architecture or manner of interconnecting the components. Other systems that have fewer or more components may also be used.

In FIG. 1A, the system 100 includes a server computer system 110 comprising a processor 112, memory 114, and user interface 116. Computer system 110 may include any number of different processors, memory components, and user interface components, and may interact with any other desired systems and devices in conjunction with embodiments of the present disclosure.

The functionality of the computer system 110, including the steps of the methods described below (in whole or in part), may be implemented through the processor 112 executing computer-readable instructions stored in the memory 114 of the system 110. The memory 114 may store any computer-readable instructions and data, including software applications, applets, and embedded operating code. Portions of the functionality of the methods described herein may also be performed via software operating on one or more of the client computing devices 120, 130, and 132.

The functionality of the system 110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 112 retrieves and executes instructions stored in the memory 114 to control the operation of the system 110. Any type of processor, such as an integrated circuit microprocessor, microcontroller, and/or digital signal processor (DSP), can be used in conjunction with embodiments of the present disclosure. A memory 114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 114 in any desired manner, such as in a relational database.

The system 110 includes a user interface 116 that may include any number of input devices (not shown) to receive commands, data, and other suitable input. The user interface 116 may also include any number of output devices (not shown) to provide the user with data, notifications, and other information. Typical I/O devices may include touch screen displays, display screens, mice, keyboards, modems, network interfaces, printers, scanners, video cameras and other devices.

The system 110 may communicate with one or more client computing devices 120, 130, and 132 as well as other systems and devices in any desired manner, including via network 140. The system 110 and/or computing devices 120, 122, 130 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 140 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The system 110 may include (e.g., in the memory 114) a database, and may communicate with any number of other databases, such as database 118. Any such databases may include a relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Figure 2:
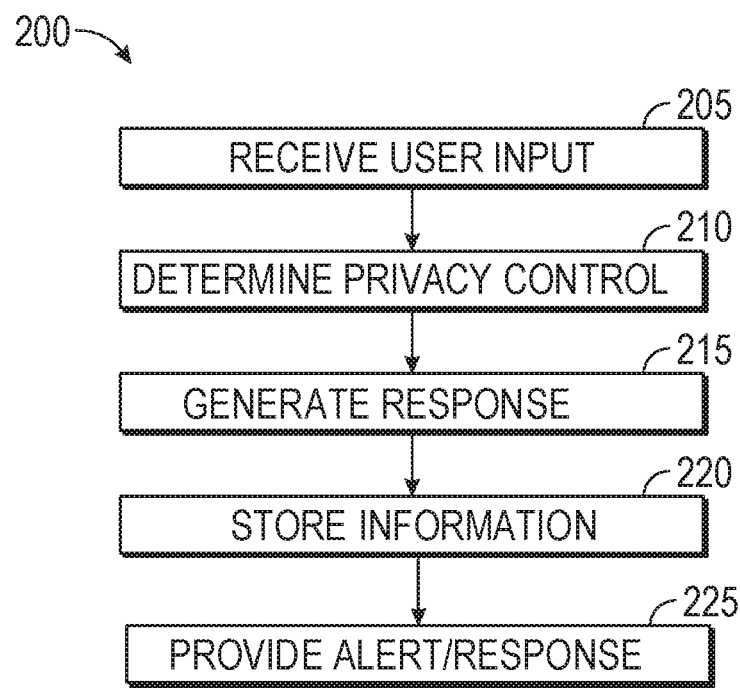
FIG. 2 is a flow diagram of an exemplary process according to various aspects of the disclosure.

FIG. 2 depicts an exemplary process according to various aspects of the present disclosure. In this example, method 200 includes receiving user input (205), determining privacy control information associated with the user (210), generating a response to the input based on the privacy control information (215), storing information associated with the input and/or response (220), and providing the response to the user (225). The steps of method 200 may be performed in whole or in part, may be performed in conjunction with some or all of the steps in other methods, and may be performed by any number of different systems, such as the systems described in FIGS. 1A and/or 3.

In the example shown in FIG. 1A for instance, a virtual assistant may be implemented entirely via software operating on a user's computing device 120, 130, or 132, or via a combination of software on a user's computing device in conjunction with software operating on the server computing system 110. In some embodiments, a virtual assistant operates on the server computer system 110 and is accessed via a web-based interface on the user's client computing device 120, 130, 132.

FIG. 1B illustrates one example of a virtual assistant operating on a computing device 140. The computing device 140 may include one or more systems, such as user's computing device 120, 130, 132, and/or server computing system 110. In this example, the virtual assistant 150 is implemented via software operating on the computing device 140. In other embodiments, the virtual assistant may be implemented via hardware, software, or a combination of the two. The virtual assistant 150 receives inputs from a user, namely keyword inputs 142, event inputs 144, voice inputs 146, and/or text inputs 148. The virtual assistant 150 analyzes the inputs and provides a response 155 to the user.

In the method 200 shown in FIG. 2, the system (e.g., server computer system 110 in FIG. 1A) receives an input from a user directed to a virtual assistant operating on the system (205). A variety of inputs from the user may be received, such as a request for information from the virtual assistant (e.g., "where is the closest restaurant?", "what is the balance of my checking account?", etc.), and/or a request for the virtual assistant to perform a task ("reserve a table for me at the restaurant you just identified," "move $100 from savings to checking," etc.). Inputs from a user may be received in a variety of different formats, such as text and audio.

The virtual assistant system determines privacy control information associated with the user (210). In this context, a "privacy control" may refer to any instruction, directive, rule, or other information pertaining to protecting information associated with a user of the virtual assistant. In some embodiments, the privacy control information may be determined based on privacy instructions received from the user (e.g., via the virtual assistant). For example, the user may provide the virtual assistant with an input containing a command to "purge my personal information" in order to cause the virtual assistant to search for any stored personal information stored by the system and delete it. In another example, the user may instruct the virtual assistant: "don't say my account information out loud," to which the virtual assistant abstains from providing any financial account information to the user audibly (e.g., via a speaker of the user's computing device), and instead provides such information in text format only.

Determining the privacy control information associated with a user may include a variety of factors. For example, the determination of privacy control information for a user may be based on determining a hierarchy of users that of the virtual assistant. In a one particular example, the system may identify privacy controls for preventing access to information by the children of a parent, but allow access of all information associated with the children by the parent. In another example, the system may determine different privacy controls for members of a corporate organization, such as providing an employee with access to his/her own information, but limiting access to all other employees, yet allowing the security executive of the corporation access to the information of all members of the organization.

Likewise, privacy control information may be based on identifying information access rights of another user. For example, the virtual assistant may provide spouses who both use the VA system common access to the same information. In other cases, the VA system may determine privacy control information based on legal standards applicable to a user or information associated with a user. For example, a user's financial account information may always be protected by the VA system under various laws and regulations regardless of other user-defined privacy controls.

The system may generate a response (215) to the user's input based on the determined privacy control information. For example, the system may search for answers in response to questions from the user and provide a response containing the information. In response to instructions from the user, such as the example of reserving a table at a restaurant above, the virtual assistant may perform a task in accordance with the instructions and provide a response confirming the task is complete (e.g., "I've reserved a table for you at Joe's Restaurant at 7:30").

In some embodiments, generating the response may include selecting a manner in which to provide the response. For example, the system may determine privacy control information for the user that limits conveying financial information to the user audibly when the user is in a public place, or when another entity (such as a human or electronic surveillance system) is likely to overhear the response. Such a control may be determined in a variety of ways, such as based on a default privacy control in the system, instruction to the VA by the user, and/or a reporting standard of a financial institution holding the financial account.

In some embodiments, the system may generate a response to the user based on a determination of the user's current environment. For example, the system may use global positioning information from a mobile computing device carried by the user to determine the user's device (and thus the user) are in a restaurant or other public place where providing a response in an audio format from the VA system (e.g., on a speaker of the user's mobile device) might be overheard by entities other than the user. In such a case, the system may instead generate the response in a text format.

The system may analyze information from input devices and sensors coupled to a mobile device carried by the user (e.g., global positioning system, microphone, camera, accelerometer, etc.) to determine the user's environment. For example, the system may analyze background noise captured from a microphone coupled to the user's mobile computing device to determine whether the user is in the presence of others. In one such example, the system measures the amplitude of voices captured by the user's computing device and performs a voice recognition analysis on the captured voices to determine whether it is the user speaking, background noise (e.g., radio or television), or if there is another person proximate to the user and, if so, whether the other person is close enough to the user's mobile device to overhear an audio response from the VA system. If the system determines the person (or another entity, such as an electronic surveillance system) might overhear a response in an audio format, the system may instead choose to generate and provide the response from the VA to the user in a non-audio format.

In addition to potentially overhearing an audio response, the system may determine that an entity other than the user may access the response from the VA system in other ways, such as visually or by intercepting an electronic transmission. For example, the system may detect the presence of electronic devices proximate to the user (e.g., within near-field communication range) via attempts by such devices to handshake/connect to the user's mobile computing device. In another example, the system may determine, based on an analysis of images captured from a digital camera coupled to the user's computing device that there are surveillance cameras in the user's location. In cases where the system identifies one or more potential entities that may access the response from the virtual assistant, the system may alert the user that the entity may access a response provided by the virtual assistant, and either abstain from providing responses with information protected by privacy controls or prompt the user to authorize delivery of such responses.

The system may store (220) a variety of information associated, for example, with the inputs from a user and/or the responses from the virtual assistant. Such information may be stored in a database by the VA system, such as a database stored in the memory 114 of server computer system 110 in FIG. 1A. Storage and/or reporting of such data (to the user or other users of the VA system) may be set automatically or may be received from a user. For example, the user may provide an input to the VA system that includes a voice command indicating that data captured is to be private ("VA, I need privacy") or provide UI with detailed list of data to include or exclude in data that is stored or reported.

In some cases, the privacy controls may be determined based on legal requirements or financial institution policies (e.g., data that memorializes instructions from user). In some examples, the information that is stored or reported by the VA system can be filtered to exclude extraneous content, such as obscenities, background noise, and/or content that is irrelevant to the user's input or the response from the VA, such as small talk, voice input from individuals who are not users of the VA system, etc.

In some embodiments, the system automatically deletes at least a portion of the information associated with the input and/or responses prior to, or subsequent to, the information being stored. For example, data received by the VA system may be tagged at collection as deletable or non-deletable. Deletable data may be deleted, for example, at a predetermined interval, after the data is held for a predetermined time, and/or upon a command from the user.

The system may provide (225) alerts, responses, and other information to the user in a variety of different ways. In some embodiments, the system provides a response to a user's input in the same format (e.g., audio, text, etc.) as the input. In this context, a "response" generally refers to any output provided by the system to the user. Accordingly, the virtual assistant system may provide a user information, perform a task, or take other action without a user necessarily providing any input.

In some embodiments, as discussed above, the VA system may be adapted to detect a third-party system attempting to, or potentially able to, intercept or access information from the virtual assistant. In such cases, the system may provide an alert the user using the VA. In addition to alerting the user, the system may disable a feature of the user's computing device to help protect the user. For example, the system may identify third-party systems or devices attempting to track a user's location via the user's mobile device by establishing communications with the user's mobile device. In such cases, the VA system may provide an alert to the user via the virtual assistant that identifies the third party systems while automatically turning off the location function of a mobile device. The system may also turn off features of a user's computing device (or the device entirely) until the system determines the user is no longer in danger of being surveilled.

The system may also detect an attempt to access information associated with the user, as well as inputs from, and responses to, the user from the VA system. For example, if another user attempts to access a stored audio recording containing the user's instructions to the VA system (e.g., by accessing the database where the recording is stored via a web-based interface) the system may immediately alert the user to the attempt via the virtual assistant, giving the user the option to allow or deny the access.

The system may provide responses and other content to users using the virtual assistant based on the user's environment. For example, the system may detect (e.g., using the camera, microphone, communication modules, and/or other sensors or components of the user's computing device) the presence of a third party proximate to the computing device of the user where the content from the VA is to be delivered. In specific examples, the VA system may determine the user is in a business meeting with colleagues, at a crowded bar, or in another environment where individuals nearby could potentially eavesdrop or view content delivered to the user by the VA system. In such cases, the system may select a format for providing a response or other content to the user based on the presence of such third parties.

In one example, a user may request his or her bank account balance from the virtual assistant. Though the request may be provided audibly, the system may determine the user's computing device is close enough to other people that providing the response audibly is likely to be overheard. In this example, the system may still provide an audio response, but do so at a diminished volume such that only the user can hear the response. Additionally or alternatively, the system may provide the response on the display screen of the user's device instead of in audio format. Furthermore, the system may reduce the brightness level of the display of the user's computing device during presentation of the response to further help avoid disclosing information to nearby third parties.

In some embodiments, the VA system filters and regulates social media posts (e.g., related to location of user or group of users—such as a family) and hold social media posts until reviewed/approved by the user. For example, if a user's child attempts to post a picture to a social media website, the VA system may intercept the post, alert the parents of the child, and only complete the post in response to authorization by the parents. In another example, the VA system may intercept an attempt by an employee of a company from posting an article regarding a product made by the company to a social media site or other website. The system may alert the company's legal department or other authority within the company to the attempted post and only complete the posting after authorization is provided.

Figure 3:
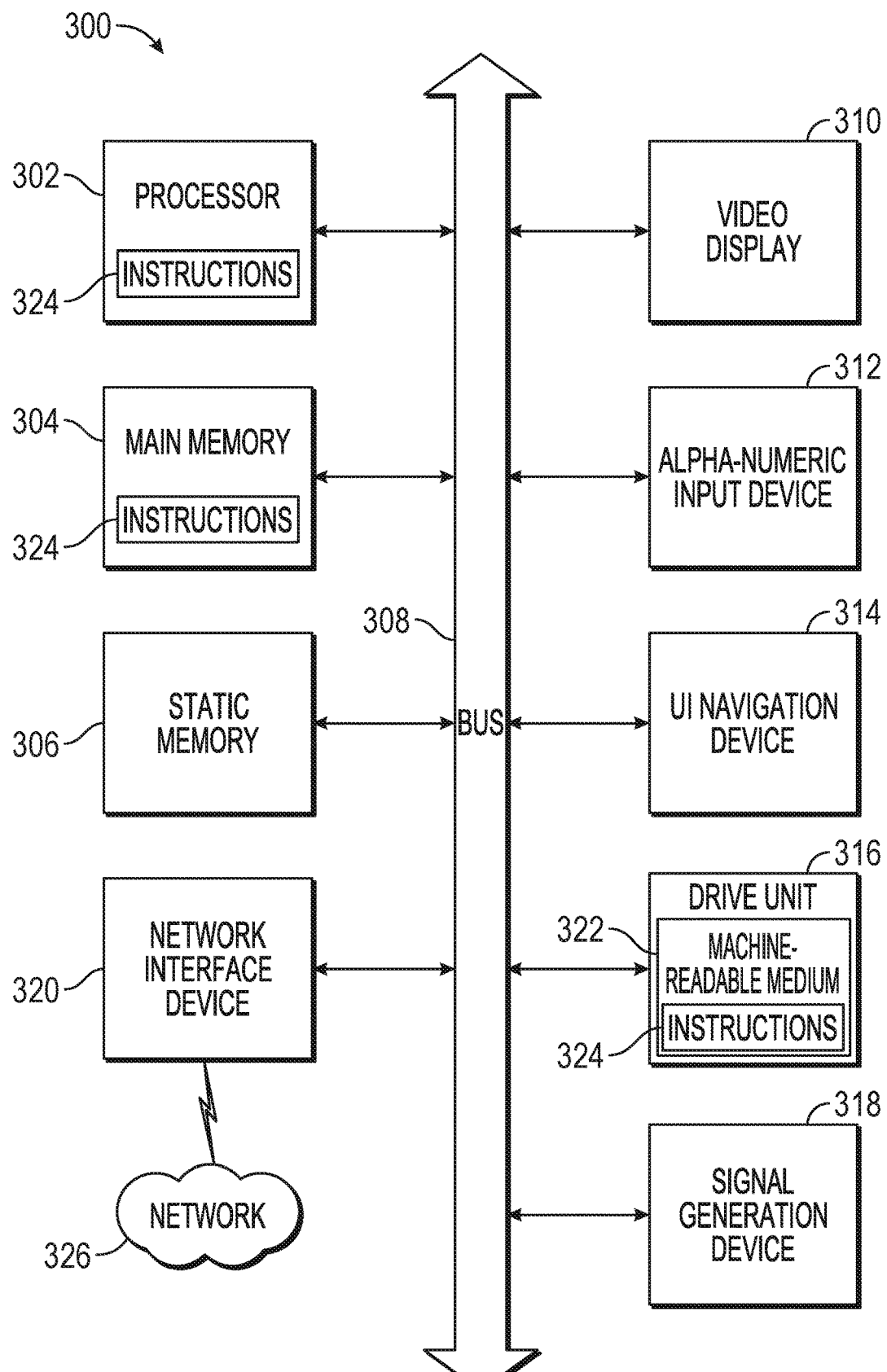
FIG. 3 is a block diagram of an exemplary machine according to various aspects of the disclosure.

FIG. 3 is a block diagram illustrating exemplary components of a computing system 300 that may operate in conjunction with embodiments of the present disclosure. System 300 (in whole or in part) may be (or include) any of the computing devices 120, 130, 132 shown in FIG. 1A. In this example, system 300 reads instructions 324 from a machine-readable medium (e.g., a tangible, non-transitory, machine-readable storage medium) 322 to perform a variety of functions, including any of the processes (in whole or in part) described herein.

System 300 can be connected (e.g., networked) to other machines. In a networked deployment, the system 300 can operate in the capacity of a server machine or a client machine in a server-client network environment, as well as a peer machine in a peer-to-peer (or distributed) network environment. System 300 may be (or include) a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 324, sequentially or otherwise, that specify actions to be taken by that machine. While only a single machine is illustrated in FIG. 3, the term "machine" or "system" as used herein may also include any number of different devices, systems, and/or machines that individually or jointly execute the instructions 324 to perform any one or more of the methodologies discussed herein. Additionally, alternate systems operating in conjunction with the embodiments of the present disclosure may have some, all, or multiples of the components depicted in FIG. 3.

In the example shown in FIG. 3, system 300 includes processor 302. Any processor may be used in conjunction with the embodiments of the present disclosure, such as a central processing unit (CPU), a graphics processing unit (GPU), a digital signal processor (DSP), an application specific integrated circuit (ASIC), a radio-frequency integrated circuit (RFIC), or any suitable combination thereof. System 300 further includes a main memory 304 and a static memory 306, which are configured to communicate with each other via a bus 308.

The system 300 further includes a user interface that may include a variety of components, including one or more output devices such as a graphics display 310 (e.g., a plasma display panel (PDP), a light emitting diode (LED) display, a liquid crystal display (LCD), a projector, or a cathode ray tube (CRT)). The user interface of the system 300 may also include any number of input devices and other components, including an alphanumeric input device 312 (e.g., a keyboard), a cursor control device 314 (e.g., a mouse, a touchpad, a trackball, a joystick, a motion sensor, or other pointing instrument), a storage unit 316, a signal generation device 318 (e.g., a speaker), and a network interface device 320.

The storage unit 316 includes a machine-readable medium 322 on which is stored the instructions 324 (e.g., software) embodying any one or more of the methodologies or functions described herein. The instructions 324 can also reside, completely or at least partially, within the main memory 304, within the processor 302 (e.g., within the processor's cache memory), or both, during execution thereof by the system 300. Accordingly, the main memory 304 and the processor 302 can be considered as machine-readable media. The instructions 324 can be transmitted or received over a network 326 via the network interface device 320.

As used herein, the term "memory" may refer to any machine-readable medium able to store data temporarily or permanently, including random-access memory (RAM), read-only memory (ROM), buffer memory, flash memory, and/or cache memory. While the machine-readable medium 322 is shown in this example as a single medium, the term "machine-readable medium" may include a single medium or multiple media (e.g., a centralized or distributed database, or associated caches and servers) able to store instructions 324. The term "machine-readable medium" may also include any medium, or combination of multiple media, that is capable of storing instructions (e.g., software) 324 for execution by a machine. Accordingly, a "machine-readable medium" refers to a single storage apparatus or device, as well as "cloud-based" storage systems or storage networks that include multiple storage apparatus or devices. The term "machine-readable medium" may also include one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A system comprising:
   a first device comprising:
      a processor; and
      memory coupled to the processor and storing instructions that, when executed by the processor, cause the system to perform operations comprising:
      receiving an input from a user directed to a virtual assistant operating on the system;
      generating a response to the received input;
      identifying an information access right of a second user;
      determining privacy control information associated with the user based upon input provided by the user and the information access right of the second user;
      determining based upon the privacy control information and the response, that the response contains private information to be protected; and
      responsive to determining that the response contains private information to be protected:
         determining, whether an identified voice is proximate to the user based upon an amplitude of an identified voice captured by a microphone coupled to the processor and that the identified voice corresponds to a person that may overhear an audio response from the virtual assistant at a normal response volume level of the virtual assistant;
         analyzing an image taken by a camera coupled to the processor to determine whether a surveillance camera is proximate to the user;
         responsive to determining that the identified voice corresponds to the person that may overhear an audio response from the virtual assistant or that a surveillance camera is proximate alerting the user that an entity may access the response from the virtual assistant;
         identify a third party device that is attempting to track a user's location; and
         responsive to determining that the third party device is attempting to track the user's location, automatically turning off a location functionality of the first device.

2. The system of claim 1, wherein determining the privacy control information for the user includes retrieving privacy instructions received from the user via the virtual assistant.

3. The system of claim 1, wherein the input includes one or more of:
   audio input, and text input.

4. The system of claim 1, wherein the operations further comprise prompting the user to authorize delivery of the response.

5. The system of claim 1, wherein the memory further stores instructions for causing the system to store, based on the privacy control information, information in a database related to one or more of the input and the response.

6. The system of claim 1, wherein determining the privacy control information for the user includes one or more of:
   determining a hierarchy of users of the virtual assistant to which the user belongs, identifying information access rights of another user of the virtual assistant, and determining a legal standard applicable to the user.

7. A method comprising:
   receiving, by a computer system, an input from a user directed to a virtual assistant operating on the system;
   generating a response to the received input;
   identifying an information access right of a second user;
   determining privacy control information associated with the user based upon input provided by the user and the information access right of the second user;
   determining based upon the privacy control information and the response, that the response contains private information to be protected; and
   responsive to determining that the response contains private information to be protected:
      determining, whether an identified voice is proximate to the user based upon an amplitude of an identified voice captured by a microphone coupled to the computer system and that the identified voice corresponds to a person that may overhear an audio response from the virtual assistant at a normal response volume level of the virtual assistant;
      analyzing an image taken by a camera coupled to the computer system to determine whether a surveillance camera is proximate to the user;
      responsive to determining that the identified voice corresponds to the person that may overhear an audio response from the virtual assistant or that a surveillance camera is proximate alerting the user that an entity may access the response from the virtual assistant;
      identify a third party device that is attempting to track a user's location; and
      responsive to determining that the third party device is attempting to track the user's location, automatically turning off a location functionality of the computer system.

8. The method of claim 7, wherein determining the privacy control information for the user includes retrieving privacy instructions received from the user via the virtual assistant.

9. The method of claim 7, wherein the input includes one or more of:
   audio input, and text input.

10. The method of claim 7, wherein the method further comprises prompting the user to authorize delivery of the response at the reduced volume level.

11. The method of claim 7, further comprising storing, based on the privacy control information, information in a database related to one or more of the input and the response.

12. The method of claim 7, wherein determining the privacy control information for the user includes one or more of:
   determining a hierarchy of users of the virtual assistant to which the user belongs, identifying information access rights of another user of the virtual assistant, and determining a legal standard applicable to the user.

13. A non-transitory computer-readable medium storing instructions that, when executed by a computer system, cause the computer system to perform operations comprising:

receiving an input from a user directed to a virtual assistant operating on the system;

generating a response to the received input;

identifying an information access right of a second user;

determining privacy control information associated with the user based upon input provided by the user and the information access right of the second user;

determining based upon the privacy control information and the response, that the response contains private information to be protected; and responsive to determining that the response contains private information to be protected:

determining, whether an identified voice is proximate to the user based upon an amplitude of an identified voice captured by a microphone and that the identified voice corresponds to a person that may overhear an audio response from the virtual assistant at a normal response volume level of the virtual assistant;

analyzing an image taken by a camera coupled to the computer system to determine whether a surveillance camera is proximate to the user;

responsive to determining that the identified voice corresponds to the person that may overhear an audio response from the virtual assistant or that a surveillance camera is proximate alerting the user that an entity may access the response from the virtual assistant;

identify a third party device that is attempting to track a user's location; and responsive to determining that the third party device is attempting to track the user's location, automatically turning off a location functionality of the computer system.

14. The non-transitory computer-readable medium of claim 13, wherein determining the privacy control information for the user includes one or more of: determining a hierarchy of users of the virtual assistant to which the user belongs, identifying information access rights of another user of the virtual assistant, and determining a legal standard applicable to the user.

* * * * *